UNITED STATES PATENT OFFICE.

JAMES W. MURPHY, OF CHICAGO, ILLINOIS.

METALLIC PAINT COMPOSITION.

1,367,888.  Specification of Letters Patent.  Patented Feb. 8, 1921.

No Drawing.  Application filed May 29, 1920.  Serial No. 385,106.

*To all whom it may concern:*

Be it known that I, JAMES W. MURPHY, a citizen of the United States, residing at Chicago, in the county of Cook and State of Illinois, have invented certain new and useful Improvements in Metallic Paint Composition, of which the following is a specification.

The principal object of the invention is to provide a liquid vehicle for aluminum, gold, silver, or other metallic powder, commonly known as "bronze liquid", which may be used with good results with either of the above-mentioned powders, and which is adapted for use on any substance which it is customary to coat, the mixture being of such composition that it will withstand extremes of both heat and cold, and will not be affected by moisture. This last feature of my composition enables its application to objects exposed to the weather.

A further object is to provide a rapidly drying elastic composition which will not discolor the powder with which it is used, whether that be gold, silver, aluminum, or other metallic powder.

A still further object is to provide a metallic paint composition which may be prepared and kept for use when desired.

The liquid body is composed of the following ingredients, but although the percentages given indicate practical proportions, it will be understood that the same may be varied to compensate for various grades of the materials used and the requirements of the particular circumstances under which the same are applied, i. e. 66⅔% spirits of turpentine, and 33⅓% commercial japan by volume. This liquid may be poured upon a sufficient quantity of gold, silver, or aluminum powder to form a paint of the consistency desired, and the resulting composition thoroughly mixed and stirred, and applied to the object to be painted therewith by a brush in the usual manner, or by other means.

A japan which I have found to be satisfactory is compounded as follows:

58% resin,
9½% red lead,
9½% litharge,
2½% black manganese oxid (finely powdered),
4½% boiled linseed oil, previously heated.

The ingredients are mixed together and boiled until a sample thereof will dry brittle when placed on glass. When this stage is reached the contents are removed, and when reduced in temperature from "hot" to "warm" 16% spirits of turpentine is added.

The paint formed by mixing this liquid with any one of the above-mentioned commercial powders is rapid drying, and is adapted for immediate use. It will be found very satisfactory when used on wood and metallic surfaces, and also when applied to fabrics. When applied under ordinary circumstances it will be dry in approximately fifteen minutes. A variation in the percentage of japan used will vary the rapidity of the drying action of the paint.

When it is desired to mix metallic paint for future use, I recommend the following proportions, taken by volume:

Powder (gold, silver, aluminum, or other metallic) one-third;
Liquid body two-thirds.

The liquid should be poured upon the powder, thoroughly mixed and stirred, and the composition, if placed in a tight receptacle, will keep indefinitely.

It will be understood that the proportions of the materials given are those that I prefer in ordinary use, but that the same may be varied under different conditions without departing from the scope of the invention as defined in the appended claims.

I claim:—

1. A metallic paint consisting of metallic powder, japan, and turpentine of approximately three parts powder, two parts japan, and four parts turpentine.

2. The process of making metallic paint, consisting of mixing turpentine with japan, pouring the resulting mixture on a quantity of metallic powder, and thoroughly stirring the same.

3. A metallic paint consisting of metallic powder, turpentine and japan, the proportion of turpentine being greater than the proportion of either the powder or japan.

4. A metallic paint consisting of metallic powder, turpentine, and japan, the proportion of powder being less than the proportion of turpentine but greater than the proportion of japan.

In testimony whereof, I have subscribed my name.

JAMES W. MURPHY.